United States Patent [19]

Schade et al.

[11] 4,038,254

[45] July 26, 1977

[54] PROCESS FOR THE MANUFACTURE OF WIRE INSULATION VARNISH RESINS SUITABLE CHIEFLY FOR APPLICATION IN THE MELTED STATE

[75] Inventors: Gerhard Schade; Peter Uckert; Manfred Fritz, all of Witten, Germany

[73] Assignee: Dynamit Nobel Aktiengesellschaft, Troisdorf, Germany

[21] Appl. No.: 602,032

[22] Filed: Aug. 5, 1975

Related U.S. Application Data

[63] Continuation of Ser. No. 446,063, Feb. 26, 1974, abandoned.

[30] Foreign Application Priority Data

Mar. 1, 1973 Germany .............................. 2310247

[51] Int. Cl.$^2$ ...................... C08G 63/20; C08G 63/68
[52] U.S. Cl. .............................. 260/75 N; 260/75 M; 428/379
[58] Field of Search ............................ 260/75 N, 75 M

[56] References Cited

U.S. PATENT DOCUMENTS

| | | | |
|---|---|---|---|
| 3,382,203 | 5/1968 | Rating et al. | 260/33.4 |
| 3,415,903 | 12/1968 | Bottger et al. | 260/857 |
| 3,426,098 | 2/1969 | Meyer et al. | 260/841 |
| 3,629,201 | 12/1971 | Dobbelstein et al. | 260/75 N |
| 3,849,382 | 11/1974 | Nakatsuji et al. | 260/75 N |
| 3,852,246 | 12/1974 | Schmidt et al. | 260/75 N |

FOREIGN PATENT DOCUMENTS 1,055,287  1/1967  United Kingdom

*Primary Examiner*—Howard E. Schain
*Assistant Examiner*—W. C. Danison, Jr.
*Attorney, Agent, or Firm*—Burgess, Dinklage & Sprung

[57] ABSTRACT

A process for the manufacture of wire insulation varnish resins suitable for application from the melted state which comprises:

1. Contacting a lower alkyl ester of terephthalic acid with tris-(hydroxyethyl)-isocyanurate and ethylene glycol in the presence of a trans esterification catalyst in the presence of 0.3 to 1.5% of an alcoholate of titanium, vanadium or zirconium and effecting transesterification under transesterification conditions;
2. Contacting the transesterification product from step 1 with trimellitic acid anhydride under esterification conditions to further effect esterification, but prior to completion of such esterification;
3. Adding to the reaction mixture 4,4'-diaminodiphenyl methane in an amount such that the molar ratio of trimellitic acid derived from trimellitic acid anhydride to said 4,4'-diaminodiphenylmethane is 2 to 1; and
4. Polycondensing the reaction mixture until a resin is formed having a consistency at 140° to 160° C such that it can be applied to a wire substrate in melted form.

12 Claims, No Drawings

PROCESS FOR THE MANUFACTURE OF WIRE INSULATION VARNISH RESINS SUITABLE CHIEFLY FOR APPLICATION IN THE MELTED STATE

This is a continuation of application Ser. No. 446,063 filed Feb. 26, 1974, now abandoned.

BACKGROUND OF THE INVENTION

1. Field of the Invention

This invention is directed to the production of wire insulation varnish resins which can be readily employed in the melted form. More particularly, this invention is directed to the use of wire insulation varnish resins which can be employed without the use of solvents in the melted state and which have a desirable viscosity characteristic such that high temperatures are not required to obtain the resin in a suitable workable form. This invention is directed to the process of making such resins.

2. DISCUSSION OF THE PRIOR ART

It has been known to prepare wire insulation varnish resins from terephthalic and/or isophthalic acids and their esters using a more than bivalent alcohol and a diol. After these materials are dissolved in a cresol-containing solvent mixture containing a hardener such as alkyl titanate, they are applied to a wire conductor and baked thereon.

It is furthermore known to apply such resins in the melted state, without the use of solvents (Yu. I. Linin, Tr. Tomsk. Nauch., Issled. Inst. Kabel. Prom. 1969, No. 1, 231–39). This procedure has considerable advantages over application from solution, one prominent advantage being the fact that pollution of the air due to cresolic solvents which evaporate during the baking process is entirely eliminated.

Resins of the above-described composition, however, provide the conductors with coatings which no longer fully satisfy today's requirements. It has therefore been proposed to replace the radicals of terephthalic acid and/or isophthalic acid wholly or partially with those of a dicarboxylic acid having two imide groups and having the general formula

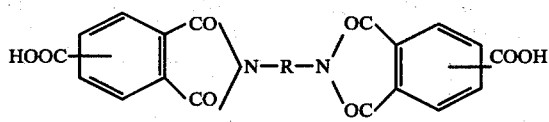

wherein —N—R—N— represents the radical of a diprimary diamine, preferably of 4,4'-diaminodiphenylmethane.

This dicarboxylic acid containing two imide groups may also be produced in situ in the presence of all or part of the other resin-forming starting materials in the course of the resinification, from trimellitic acid anhydride and diamine in a molar ratio of about 2 to 1, and may be condensed with those materials. This procedure is disclosed, for example, in German "Offenlegungsschriften" Nos. 1,520,061 and 1,495,456.

Another known device is the use of tris-(hydroxyethyl)-isocyanurate as a polyfunctional alcohol in the resins of the initially described composition (cf. German "Offenlegungsschrift" No. 1,590,442).

The resins corresponding to the present-day state of the art accordingly contain radicals of the above-mentioned dicarboxylic acid containing two imide groups, in addition, in some cases, to radicals of terephthalic acid, and also radicals of tris-(hydroxyethy)-isocyanurate and ethylene glucol. Such products are marketed in the dissolved state with hardeners added as wire insulating varnishes, and to a great extent they satisfy the requirements made of such varnishes (cf. German "Offenlegungsschrift" No. 1,645,435, for example).

Resins of such composition have comparatively high softening points which softening points increase as the degree of condensation increases. They are therefore scarcely suitable for application from the melt, since at relatively low temperatures of 140° to 160° C they have too high a viscosity and at higher melting temperatures — say of 160° to 180° C— their viscosity is changed by further condensation in proportion to the detention time. To remedy this difficulty it has been proposed that comparatively small amounts of a solvent be added to such resins, or that they be made in the presence of a solvent, in such a manner that a sufficiently low melt viscosity will be obtained at a temperature that will prevent further condensation (German "Offenlegungsschrift" No. 2,135,157).

This procedure, however, is not very advantageous for two reasons: (1) On the one hand, the initially mentioned problem of atmospheric pollution is not eliminated but only diminished, and (2) on the other hand, the viscosity of the melted resins containing solvent changes in the course of time due to the evaporation of the solvent at the melting temperature, at least when the melt is in open containers such as those commonly used with the wire varnishing machines of the conventional type.

It has therefore become desirable to provide a wire insulation varnish resin which can be applied in the melt and which does not require the use of cresol-containing solvents. Moreover, it has become desirable to provide a varnish resin whose viscosity is suitable to allow the resin to be applied to a conductive substrate employing temperatures of 140° to 160° C.

SUMMARY OF THE INVENTION

Broadly, this invention contemplates a process for the manufacture of wire insulation varnish resins suitable mainly for application from the melted state which comprises:

1. Contacting a lower alkyl ester of terephthalic acid with tris-(hydroxyethyl)-isocyanurate and ethylene glycol in the presence of a 0.3 to 1.5 wt. percent of an alcoholate of titanium, vanadium or zirconium, and trans esterification catalysts and effecting trans esterification under trans esterification conditions;
2. Contacting the trans esterification product from step 1 with trimellitic acid anhydride under esterification conditions to effect further esterification, but prior to completion of such further esterification;
3. Adding to the reaction mixture 4,4'-diaminodiphenylmethane in an amount such that the molar ratio of the trimellitic acid derived from trimellitic acid anhydride to said 4,4'-diaminodiphenylmethane is 2 to 1; and
4. Polycondensing the reaction mixture until a resin is formed having a consistency of 140° to 160° C such that it can be applied to a wire substrate in melt form.

In accordance with the present invention it has been found that a wire varnish resin can be prepared which has a viscosity between about 5,000 and 20,000 cP at temperatures of 140° to 160° C. by following a specific set of process conditions. Generally, the process involves the commencement of an initial transesterification employing a lower alkyl ester of terephthalic acid which is condensed in the presence of 0.3 to 1.5% of an alcoholate of titanium, vanadium or zirconium and further transesterification catalysts with tris-(hydroxyethyl)-isocyanurate and ethylene glycol. The transesterification is carried out at temperatures of between 140° and 210° C., at atmospheric pressure for between 2 and 8 hours. The esterification is carried out until between 90 and 100% of the theoretically possible esterification is provided (as determined by the amount of alcohol corresponding to the lower alkyl ester distilled over).

In the second step of the process, the transesterification product obtained by the first step as described above is contacted with trimellitic acid anhydride under esterification conditions to effect esterification of the thus formed product. This subsequent esterification can be carried out at temperatures between 160° and 200° C, at atmospheric pressure for between 20 and 200 minutes. This step, however, is carried out so that only between 40 and 55% of the theoretically possible esterification can be accomplished. Thereafter, the 4,4'-diaminodiphenylmethane is added to the reaction mixture whereby the further esterification of the trimellitic acid anhydride is abruptly halted. Thus, when the esterification with the trimellitic acid anhydride has reached a maximum of about 40–45% of the theoretically possible esterification, the 4,4'-diaminodiphenylmethane is added thereto between 3 and 15 minutes so as to inhibit the further esterification of the trimellitic acid anhydride. The 4,4'-diaminodiphenylmethane is added to the reaction mixture such that the molar ratio of the trimellic acid derived from the trimellitic acid anhydride to the 4,4'-diaminodiphenylmethane is between 2.1 and 1.9, preferably between 2.05 and 1.95 and typically 2:1.

Thereafter, the reaction mixture is subjected to a polycondensation step typically carried out at a temperature between 190° and 220° C., at a pressure between 1 and 0.1 atm. until a resin is formed having a consistency at 140° to 160° C. such that it can be applied to a wire substrate in melt form. Generally speaking, the polycondensation is carried out for a period of time of between 1 and 5 hours until there is provided a resin whose melt viscosity ranges between 5,000 and 20,000 cP determined at 140° C. The melt viscosity values can be determined in accordance with the test procedure of DIN 53 177.

With respect to the quantities of reactants the following table demonstrates the broad and preferred amounts of the various agents employed in the present process.

TABLE 1

| Reaction | Range of Molar Ratios of Reagents | |
|---|---|---|
| | Broad | Preferred |
| Alkyl ester of terephthalic acid | 1 to 4 | 1 to 3 |
| Tris-(hydroxyethyl)-isocyanurate | 1 to 3 | 1 to 2 |
| Ethylene glycol | 3 to 15 | 5 to 12 |
| Trimellitic acid anhydride | 1 to 4 | 2 to 4 |
| 4,4'-diaminodiphenylmethane | 0.5 to 3 | 1 to 2 |

DESCRIPTION OF PREFERRED EMBODIMENTS

Thus, it has been found that the above-described disadvantages of prior art resins synthesis can be eliminated and wire insulating varnish resins outstandingly suitable for application in the melted state obtained if:

1. In a first step, dimethylterephthalate is transesterified with excess ethylene glycol and tris-(hydroxyethyl)-isocyanurate in the presence of 0.3 to 1.5% of an alcoholate of titanium, zirconium or vanadium or mixtures thereof, with reference to the weight of the sum of all resin-forming monomers, in the presence in some cases of catalytic quantities of additional transesterification catalysts known in the art, such as zinc acetate, cerium octoate, lead oxide etc.,
2. Thereafter trimellitic acid anhydride is added and the latter is esterified to such an extent that about 45 to 50% of the three carboxyl groups of the trimellitic acid (equivalent to the trimellitic acid anhydride) are esterified; thereafter (3) the esterification reaction is terminated by the immediate addition of the entire amount of diamine, amount to about 1 mole for every 2 moles of trimellitic acid anhydride, and
3. The polycondensation is continued with the removal of water and/or ethylene glycol until the melt has at 140° to 160° C a melt viscosity that is usable for application in the melted stated. The melt viscosity range that can be used for application in the melted state generally ranges between about 5000 and 20,000 cP.

The preferred alcoholates to be used are those of the general formula $Ti(OR)_4$, $Zr(OR)_4$, and $O=V(OR)_3$ in which R represents a cycloalkyl of C4 to C8 or a branched or unbranched alkyl having up to 5 carbon atoms in the chain. The alcoholates can also be partially hydrolyzed in some cases, and in some cases may be condensed to oligomers by the removal of water. Preference is given to the use of the n-butyl and isopropyl titanates, zirconates and vanadates, especially tetra-n-butyltitanate or tetraisopropyltitanate.

The procedure of the invention results in several surprising effects not predictable from the prior art. On the one hand, the alcoholate — of titanium, for example — present in considerable amounts during the reaction does not, in the course of the formation of water of reaction from the diamine and the trimellitic acid partial ester, become saponified to a turbidity causing titanium dioxide and instead the resin remains completely clear. However, troublesome turbidity does occur, unexpectedly, whenever the titanium alcoholate is added at any later time during the resinification.

Also, it was not to be expected that the presence of the comparatively large amounts of alcoholate do not adversely affect the stability of the end products when melted at 140° to 160° C. Furthermore, it was not foreseeable, either, that introducing the alcoholate into the resin would enable the degree of polycondensation to be kept extremely low for the purpose of achieving a melt viscosity sufficiently low for application directly from the melt. If resins of analogous composition are condensed to the same low degree of polycondensation without the addition of a titanium alcoholate, for example, and if they are dissolved in a conventional manner in a mixture of cresol and naphtha solvent, and the amount of titanium alcoholate mentioned in the beginning is added to this solution, the coatings produced by baking onto copper wire have utterly unsatisfactory characteristics for the intended technical use (see Example 2).

Accordingly, the subject matter of the invention is a process for the manufacture of wire insulating varnish resins, suitable chiefly for application in the melted state, through transesterification of dimethylterephthalate with tris-(hydroxyethyl)-isocyanurate and ethylene glycol in the presence of catalyst, esterification of this transesterification product with trimellitic acid anhydride to a foreproduct containing carboxyl groups, and addition of 4,4'-diaminodiphenylmethane in a trimellitic acid anhydride-to-diamine ratio of about 2:1, followed by polycondensation. This process is characterized in that 0.3 to 1.5% of an alcoholate of titanium and/or vanadium and/or zirconium, with reference to the total weight of all resin-forming monomers is added to the mixture that is to be transesterified, that the further esterification of the trimellitic acid anhydride is stopped abruptly by the rapid addition of the total amount of the diamine, and that the polycondensation is continued until the resin has, at 140° to 160° C, a consistency that is practical for its application in the melted state. Generally, the co-monomers are polycondensed in this stage at between 190° and 220° C. for between 1 and 5 hours.

Although the wire insulating varnish resins manufactured in the proposed manner are of special interest from the viewpoint of application in the melted state, one can dissolve them in mixtures of cresol and naphtha solvent and use these solutions, preferably without any further addition of hardeners, for the varnishing of electrical conductors in the prior-art manner. This kind of application has the advantage in general over conventional varnishes of the same composition that the mechanical characteristics of the insulated conductors remain virtually constant over extraordinarily wide variations of bake-on conditions. A very great "speed latitude" is, of course, highly desirable, since it aids greatly in preventing manufacturing defects.

In order to more fully illustrate the nature of the invention and the manner of practicing the same, the following examples are presented:

EXAMPLE 1

In a 2-liter round flask having a stirrer, an inert gas supply tube and a descending condenser, 290 g of dimethylterephthalate (1.5 moles), 289 g of tris-(hydroxyethyl)-isocyanurate (1.1 mole), 105 g of ethylene glycol (1.7 moles), 3 g of cerium octoate and 0.2 g of zinc acetate dihydrate were weighed in and melted down. After melting, and at an internal temperature of 130° C, 10 g of tetra-n-butyl titanate was stirred in and then 95 g of methanol was distilled out at 150° to 200° C over a period of about 5 hours. Then 170 g of additional ethylene glycol (2.74 moles) was added (the addition of the glycol in 2 steps is desirable since this forces the tris-(hydroxyethyl)-isocyanurate to participate in the transesterification reaction) and 410 g of trimellitic acid anhydride (2.14 moles) was stirred in. The temperature, which had been lowered by this action, was again raised to 180° C, whereupon the water of esterification distilled off. As soon as 16 ml. of this water had been produced, 211 g. of 4,4'-diaminodiphenylmethane (1.05 mole) was stirred in as rapidly as possible (about 5 minutes) and the esterification reaction was thus stopped. Then a vacuum of up to about 50 Torr was applied and the temperature was maintained at 200° to 205° C. until the reduced viscosity measured in a capillary viscosimeter at 25° C on a weighed amount of 1 g of resin in 100 ml. of solution, the solvent consisting of a mixture of 60% phenol and and 40% 1,1,2,2-tetrachloethane by weight, had reached a value of 0.95. Then the resin was poured out and the condensation reaction was thus terminated.

The solidified resin was remelted and at 150° C had a viscosity of 10,000 cP. This melt viscosity remained virtually unaltered at 150° C for 8 hours.

If the experiment is modified by adding the butyl titanate a. After completion of the transesterification, b. After completion of the yielding of water of reaction resulting from the imide formation, cloudy resins are obtained, which could not be cleared up by melting them or dissolving them.

It was possible, on the other hand, to replace the tetra-n-butyltitanate of the above example with an equal amount of vanadyltri-n-butylate or tetra-n-butylzirconate without producing any noticeable peculiarities in the process of preparing the resins or appreciable differences in their technical qualities on the varnished wires.

EXAMPLE 2

The same procedure as in Example 1 was followed except that no butyl titanate was added.

EXAMPLE 3

The same procedure as in Example 1 was followed except that the addition of the diamine was not made within about 5 minutes time, but was extended uniformly over a period of about 30 minutes.

EXAMPLE 4

In the manner described in Example 1, 425 g of dimethylterephthalate (2.19 moles), 407 g of tris-(hydroxyethyl)-isocyanurate (1.56 mole) and 120 g of ethylene glycol (1.93 moles) were transesterified in the presence of 3 g of cerium octoate, 0.2 g of zinc acetate dihydrate and 12 g of tetra-n-butyltitanate; then 155 g of additional ethylene glycol (2.5 moles) was added, as well as 384 g of trimellitic acid anhydride (2.0 moles); 10 ml. of water of esterification was distilled out, the esterification reaction was terminated by the addition of 198 g of diaminodiphenylmethane, and polycondensation was continued until the melt viscosity, measured at 150° C., amounted to 12,000 cP.

EXAMPLE 5

The same procedure was followed as in Example 1 and 4, the amounts of raw material being as follows in the order of their addition: 140 g dimethylterephthalate (0.72 moles), 207 g tris-(hydroxyethyl)-isocyanurate (0.8 mole), 177 g ethylene glycol (2.85 moles), 3.5 g cerium octoate, 0.22 g zinc acetate dihydrate, 13 g tetra-n-butyl titanate, 150 g ethylene glycol (2.4 moles), 487 g trimellitic acid anhydride (2.54 moles) and 252 g diaminodiphenylmethane (1.27 mole).

The melt viscosity, measured at 150° C., amounted to 15,000 cP.

With resins prepared as in Examples 1 to 5, solutions containing about 32 wt.% in mixtures of cresol and naphtha solvent were prepared and, without further additives, they were baked onto 0.6 mm. copper wire in 7 passes at an oven temperature of 500° C., and an oven length of 2.5 m., to form varnish films 35 to 45 microns thick.

Suitable apparatus are described, for example, in the brochure, "FLK Feindrahtlackiermaschinen" of W. Aumann K.G. of Espelkamp-Mittwald, Germany.

The following important results were obtained:

TABLE 2

| Example No. | 1 | 2 | 3 | 4 | 5 |
|---|---|---|---|---|---|
| Speed latitude (m/min.) | 11–17 | — | 10–14 | 11–16 | 11–17 |
| PS (%) | 20–25 | — | 10 | 15 | 25 |
| PS/HS 180° C., 2 h (%) | 20 | — | 5–10 | 15 | 25 |
| Heat pressure, DIN 46453 (° C) | 330–350 | — | 360 | 320–360 | 320–330 |
| HS, 30 min. (° C.) | 200–210 | — | 190 | 200 | 200 |

In this table, the speed latitude is the range of speeds of wire movement within which crack-free coatings were obtainable, PS the prestretching of the varnished wire after which it is still possible to wind a coil of wire around a mandrel of the same diameter as the unvarnished wire without producing cracking, and HS the thermal shock resistance, which is either given (for a stated time-temperature stress) by the amount of prestretching which can be withstood without cracking by the varnished wire of a coil wound about a mandrel of the same diameter as the unvarnished wire (PS/HS), or is the maximum temperature which such a coil, made in the same manner from non-prestretched, varnished wire, can withstand for a period of 30 minutes without the occurrence of cracking in the varnish coating (HS, 30 min.).

In the case of the product of Example 2, cracking occurred in all speed ranges. This was also the case when 1 wt.% of tetra-n-butyltitanate (with reference to the amount of resin contained therein) was added to this varnish.

The open-top varnish container on the varnishing machine of conventional design was then provided with an electrical heater controllable by means of a thermostat extending into the container; also, a motor-driven stirrer was installed in the varnish container to enable the melt to be kept in movement. The varnishing nozzles were replaced by electrically heated nozzles which were maintained at 170° to 180° C. during the varnishing process. The bright wire passed, just before its first entry into the varnish container, through a preheating zone in which the wire was heated to about 70° to 100° C. The varnish container was charged with the melted resin heated at 150° C. and an insulating coat of 35 to 45 microns thickness was applied by a four-time immersion of the wire. The oven temperature was 500° C.

The varnished wires produced under these conditions had virtually the same properties as the wires varnished from the corresponding solutions. In the case of Example 1, varnishing was performed for 8 hours without interruption, the melted varnish being replenished from time to time with fresh product heated to 150° C.; during this time no trouble was encountered, and the properties of the varnished wire remained virtually unaltered during this period.

What is claimed is:

1. A process for the manufacture of wire insulation varnish resins suitable for application in the melted state which comprises:
   1. contacting a lower alkyl ester of terephthalic acid with tris-(2-hydroxyethyl)-isocyanurate and ethylene glycol in the presence of 0.3 to 1.5%, with reference to the weight of the sum of all resin forming monomers, of an alcoholate of titanium, vanadium or zirconium and effecting transesterification under transesterification conditions until between 90 and 100% of the theoretically possible esterification is effected;
   2. contacting the transesterification product of step 1 with trimellitic acid anhydride under esterification conditions to effect further esterification until between 40 and 55% of the theoretically possible esterification is effected;
   3. prior to completion of the esterification of step 2 immediately adding to the reaction mixture 4,4'-diaminodiphenylmethane in an amount such that the molar ratio of the trimellitic acid derived from trimellitic acid anhydride to said 4,4'-diaminodiphenylmethane is between 2.1 and 1.9:1; and
   4. polycondensing the reaction mixture until a resin is formed having a melt viscosity between 5,000 and 20,000 cP at 140° to 160° C. such that it can be applied to a wire substrate in melted form.

2. A process according to claim 1 wherein the alcoholate of titanium, vanadium or zirconium is an alcoholate of a C4 to C8 cyclic alcohol or a branched or unbranched alkanol having up to 5 carbon atoms in the chain.

3. A process according to claim 2 wherein the alcoholate is tetra-n-butyl titanate.

4. A process according to claim 2 wherein the alcoholate is tetraisopropyltitanate.

5. A process according to claim 2 wherein the reactants are present in the following mol ratio range:

| Alkyl ester of terephthalic acid | 1 to 4 |
|---|---|
| Tris-(hydroxyethyl)-isocyanurate | 1 to 3 |
| Ethylene glycol | 3 to 15 |
| Trimellitic acid anhydride | 1 to 4 |
| 4,4'-diaminodiphenylmethane | 0.5 to 3 |

6. A process according to claim 2 wherein the reactants are present in the following mol ratio range:

| Alkyl ester of terephthalic acid | 1 to 3 |
|---|---|
| Tris-(hydroxyethyl)-isocyanurate | 1 to 2 |
| Ethylene glycol | 5 to 12 |
| Trimellitic acid anhydride | 2 to 4 |
| 4,4'-diaminodiphenylmethane | 1 to 2 |

7. A process according to claim 5 wherein the trimellitic acid anhydride is esterified until about 45 to 50% of the three carboxyl groups of the trimellitic acid are in esterified form.

8. A process according to claim 5 wherein:
   a. trimellitic acid anhydride is esterified in step 2 until between about 45 and 50% of the carboxylic acid groups on the corresponding trimellitic acid are esterified;
   b. the 4,4'-diaminodiphenylmethane in step 3 is added such that the molar ratio of said diamine to trimellitic acid derived from trimellitic acid anhydride is 1:2; and
   c. the polycondensation of step 4 is carried out at a temperature between 190° and 220° C for between 1 and 5 hours.

9. A wire insulating varnish resin which is prepared by the process of claim 1.

10. A wire insulation varnish resin having a melt viscosity at 140° to 160° C. between 5,000 and 20,000 cP, said resin being the condensation product of a lower alkyl ester of terephthalic acid, tris-(2-hydroxyethyl)-isocyanurate, ethylene glycol, trimellitic acid anhydride and 4,4'-diaminodiphenylmethane, said varnish resin produced by the process of claim 1.

11. A process according to claim 1 wherein in step 3 all of the 4,4'-diaminodiphenylmethane is added to the reaction mixture within 3 to 15 minutes after the esterification of step 2 is effected to between 40 and 55% of the theoretically possible esterification.

12. A process according to claim 11 wherein the esterification of step 2 is effected until between 40 and 45% of the theoretically possible esterification has been effected.

* * * * *